United States Patent
Lovett et al.

(10) Patent No.: US 10,246,624 B2
(45) Date of Patent: Apr. 2, 2019

(54) MODIFIED DEFORMED REINFORCEMENT FIBERS, METHODS OF MAKING, AND USES

(71) Applicant: FORTA CORPORATION, Grove City, PA (US)

(72) Inventors: Jeffrey B. Lovett, Harrisville, PA (US); Christopher P. Lovett, Harrisville, PA (US); Keith Davis, Stephenville, TX (US); Daniel T. Biddle, Grove City, PA (US)

(73) Assignee: FORTA CORPORATION, Grove City, PA (US)

( * ) Notice: Subject to any disclaimer, the term of this patent is extended or adjusted under 35 U.S.C. 154(b) by 0 days.

(21) Appl. No.: 14/209,183

(22) Filed: Mar. 13, 2014

(65) Prior Publication Data

US 2014/0274815 A1    Sep. 18, 2014

Related U.S. Application Data

(60) Provisional application No. 61/788,322, filed on Mar. 15, 2013.

(51) Int. Cl.
    *C09K 8/035*    (2006.01)
    *D02G 1/00*     (2006.01)
    (Continued)

(52) U.S. Cl.
    CPC .......... *C09K 8/035* (2013.01); *C04B 16/0625* (2013.01); *C04B 16/0633* (2013.01); *C04B 16/0691* (2013.01); *C04B 20/0048* (2013.01); *C04B 26/26* (2013.01); *C04B 28/04* (2013.01); *C09K 8/487* (2013.01); *C09K 8/508* (2013.01); *C09K 8/516* (2013.01); *D02G 1/00* (2013.01); *C04B 2111/0075* (2013.01); *C09K 2208/08* (2013.01); *Y10T 428/2922* (2015.01)

(58) Field of Classification Search
    None
    See application file for complete search history.

(56) References Cited

U.S. PATENT DOCUMENTS 3,515,627 A  *  6/1970  Keitaro ............... D01F 8/08
                                                    264/168
5,234,720 A  *  8/1993  Neal .................. D01D 5/253
                                                    427/393.1
(Continued)

FOREIGN PATENT DOCUMENTS

EP    0 042 006 A1    12/1981
WO    2012114829 A1    8/2012

OTHER PUBLICATIONS

International Search Report for corresponding PCT application PCT/US14/28758 dated Aug. 11, 2014.
(Continued)

*Primary Examiner* — John J Figueroa
(74) *Attorney, Agent, or Firm* — Eckert Seamans Cherin & Mellott, LLC; Carol A. Marmo

(57) ABSTRACT

The invention relates to modified reinforcement fibers for use in a variety of applications. The modification includes crimping linear or straight reinforcement fibers to create a deformed or different shaped reinforcement fiber. Examples of the shaped fibers resulting from crimping include w-shaped, s-shaped, z-shaped and wedge-shaped.

6 Claims, 15 Drawing Sheets

(51) Int. Cl.
*D02G 3/22* (2006.01)
*C04B 26/26* (2006.01)
*C04B 28/04* (2006.01)
*C04B 16/06* (2006.01)
*C04B 20/00* (2006.01)
*C09K 8/487* (2006.01)
*C09K 8/508* (2006.01)
*C09K 8/516* (2006.01)
*C04B 111/00* (2006.01)

(56) References Cited

U.S. PATENT DOCUMENTS

| | | | |
|---|---|---|---|
| 5,399,195 A | | 3/1995 | Hansen et al. |
| 5,462,793 A | * | 10/1995 | Isoda .................. D04H 1/54 |
| | | | 428/198 |
| 5,501,275 A | * | 3/1996 | Card .................. C09K 8/62 |
| | | | 166/280.2 |
| 6,016,872 A | | 1/2000 | Davis |
| 6,071,613 A | | 6/2000 | Rieder et al. |
| 6,164,380 A | | 12/2000 | Davis |
| 6,528,157 B1 | * | 3/2003 | Hussain .................. C09K 8/805 |
| | | | 428/325 |
| 6,753,081 B1 | | 6/2004 | Lovett et al. |
| 7,168,232 B2 | | 1/2007 | Lovett et al. |
| 7,270,879 B2 | * | 9/2007 | McCrary .................. C09C 3/10 |
| | | | 166/295 |
| 7,297,663 B1 | | 11/2007 | Kilchrist et al. |
| 2004/0097155 A1 | | 5/2004 | Olson et al. |
| 2005/0187113 A1 | * | 8/2005 | Hayes .................. C09K 8/03 |
| | | | 507/119 |
| 2005/0189292 A1 | * | 9/2005 | Ward .................. B01D 39/04 |
| | | | 210/508 |
| 2006/0078682 A1 | * | 4/2006 | McDaniel .................. C09K 3/1436 |
| | | | 427/372.2 |
| 2009/0247430 A1 | * | 10/2009 | Fu .................. C09K 8/685 |
| | | | 507/211 |
| 2010/0263870 A1 | * | 10/2010 | Willberg .................. C09K 8/03 |
| | | | 166/305.1 |
| 2011/0082058 A1 | | 4/2011 | Daccord |
| 2012/0322695 A1 | | 12/2012 | Kefi et al. |
| 2013/0284518 A1 | * | 10/2013 | Wu .................. C09K 8/035 |
| | | | 175/65 |

OTHER PUBLICATIONS

European Patent Office, Extended European Search Report for European Application No. 14763631.0, dated Oct. 20, 2016.

* cited by examiner

MODIFIED DEFORMED REINFORCEMENT FIBERS, METHODS OF MAKING, AND USES

CROSS-REFERENCE TO RELATED APPLICATIONS

This application claims the benefit of priority to U.S. Provisional Patent Application No. 61/788,322 entitled "Modified Reinforcement Fibers, Methods of Making, and Uses" filed in the United States Patent and Trademark Office on Mar. 15, 2013, which is incorporated herein by reference.

FIELD OF THE INVENTION

The invention relates generally to modified reinforcement fibers, methods of making, and uses therefor. In particular, the reinforcement fibers of the invention are modified by deformation, such as by crimping.

BACKGROUND OF THE INVENTION

Various reinforcement fibers and their use in a wide variety of applications are known in the art. For example, it is known to add reinforcement fibers to building materials, such as concrete, including asphalt cement concrete and portland cement concrete and the like, to add strength, toughness, and durability, and to improve the integrity of the cement properties. For example, it is known in the art to add reinforcement fibers to concrete to reduce or prevent cracks. Typical reinforcement fibers that are added to concrete include, for example, asbestos fibers, glass fibers, steel fibers, mineral fibers, natural fibers, synthetic fibers (such as polymer and aramid fibers), and cellulose fibers. Some reinforcement fibers are better suited for particular applications than others. For example, asbestos fibers are known to provide effective reinforcement but, due to environmental and health concerns these fibers, are not extensively used. In addition, some fibers are relatively expensive.

Reinforcement fibers are also generally known for use in the drilling industry. Oil, gas and other subterranean wells are made by drilling a borehole into the ground. As the rotating drill works its way through the geological formations, the drill becomes hot and debris from the cuttings, such as rock, dirt and clay, accumulates and fills the hole. A liquid, such as fresh water, salt water or a water and oil mixture, is circulated downwardly through a drill pipe and drill bit and then upwardly through the annulus created between the drill pipe and the wall of the borehole to carry debris out of the borehole, and simultaneously to cool and lubricate the drill. However, the liquid alone typically does not remove enough debris. To improve the levels of debris removal, additives are injected within the liquid through the drill pipe into the well bore. Reinforcement fibers are known in the art for use as an additive to drilling liquids to increase the levels of debris removal. The addition of reinforcement fibers to drilling liquids increases the carrying capacity without increasing the viscosity of the liquid.

In addition to debris removal, reinforcement fibers are added to drilling liquids as a lost circulation material to prevent fluid loss through fissures and pores in the geological formations. Lost circulation generally refers to the undesirable loss of at least a portion of drilling fluid into the subterranean formation penetrated by the well bore, for example, through porous rock or open channels in the formations. Additives in the drilling liquid can function to stem the loss of circulation fluid by sealing the permeability and channel openings of the formations.

Furthermore, it is known to incorporate reinforcement fibers as a lost circulation material into the cement which is used in drilling wells. In drilling a well, a pipe string (e.g., casing and/or liner) may be run into a well bore and cemented in place. A cement composition is pumped into an annulus between the walls of the wellbore and the exterior surface of the pipe string disposed therein. The cement composition sets in the annular space, thereby forming an annular sheath of hardened, substantially impermeable cement that supports and positions the pipe string in the wellbore and bonds the exterior source of the pipe string to the subterranean formation. The annular sheath of set cement surrounding the pipe string functions to prevent the migration of fluids in the annulus. The presence of reinforcement fibers in the cement can reduce or preclude voids or cracks in the cement and therefore, reduce or preclude the flow of liquids therethrough.

SUMMARY OF THE INVENTION

In one aspect, the invention provides a modified reinforcement fiber which includes a reinforcement fiber having a length and a deformation formed in the length, wherein the deformation includes at least one crimp.

In certain embodiments, there can be six or less crimps per one inch formed in the length of the reinforcement fiber.

The fiber can be composed of a material selected from polyolefin, aramid, and nylon. In certain embodiments, the fiber is composed of a material selected from polyethylene, polypropylene, and aramid.

In another aspect, the invention provides a reinforcement fiber composition. The composition includes a plurality of reinforcement fibers and at least a portion of the plurality of reinforcement fibers includes a plurality of modified reinforcement fibers each having a length and a deformation formed in the length, wherein the deformation includes at least one crimp. The composition can include polyolefin reinforcement fibers, aramid reinforcement fibers, nylon reinforcement fibers and blends thereof. Further, the composition can include polyethylene reinforcement fibers, polypropylene reinforcement fibers, aramid reinforcement fibers and blends thereof. The composition can further include a blend of modified reinforcement fibers and reinforcement fibers without a deformation. In certain embodiments, the modified reinforcement fibers constitute about 50 weight percent based on total weight of the composition.

In still another aspect, the invention provides a method of preparing a modified reinforcement fiber. The method includes providing an original reinforcement fiber having a substantially linear shape, forming a deformation in the original reinforcement fiber by forming at least one crimp in the substantially linear shape of the fiber, and deforming the substantially linear shape of the original reinforcement fiber to produce a modified reinforcement fiber.

The deforming of the substantially linear shape can include a reinforcement fiber having a shape selected from the group consisting of w-shaped, s-shaped, z-shaped and wedge-shaped.

In certain embodiments, the crimping is performed such that one or more crimps per one inch are formed over a length of the reinforcement fiber.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE INVENTION

Figure 1:
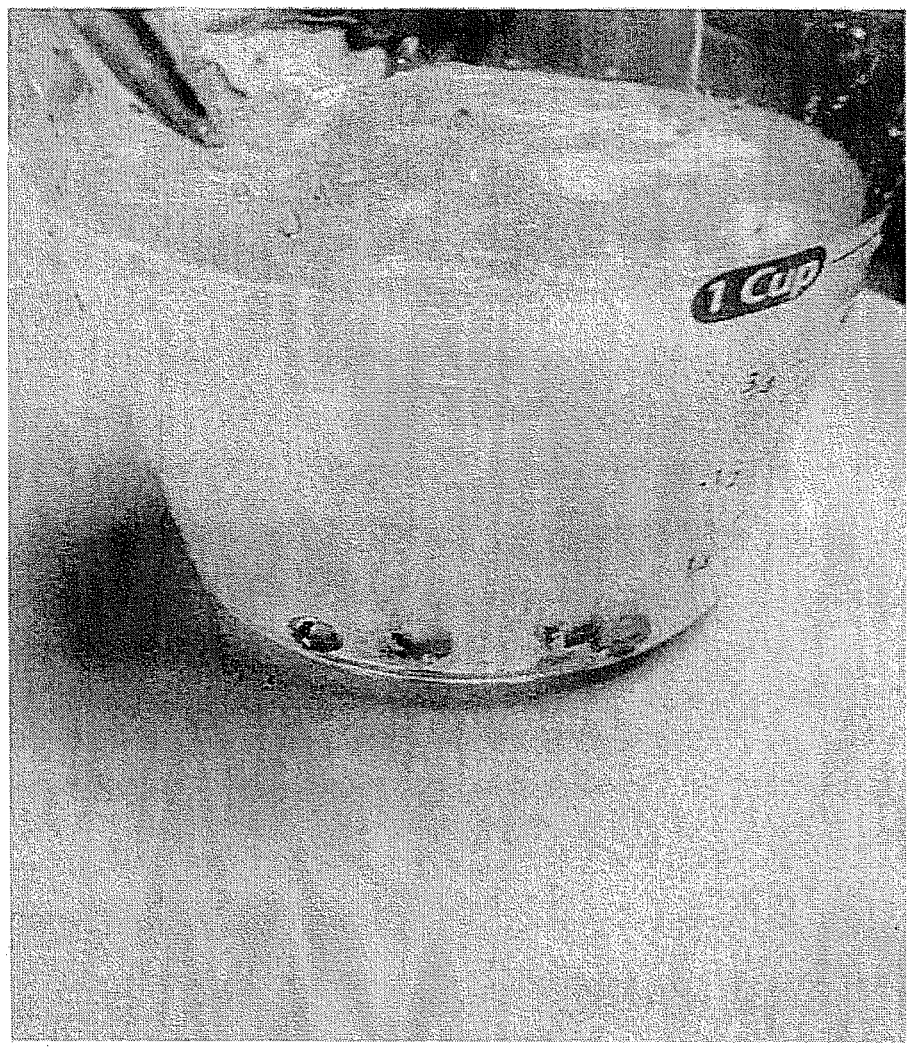
FIGS. 1 and 2 are photographs which illustrate the suspension capability of non-crimped fibers.

The present invention relates to modified reinforcement fibers. The reinforcement fibers are modified by deforming, such as by crimping. Conventional or original (i.e., non-deformed or non-crimped) reinforcement fibers have a substantially linear, e.g., straight, configuration or shape. The modified reinforcement fibers of the invention include deformation of the substantially linear configuration or shape. For example, the modified reinforcement fibers include one or more crimps formed over the length of conventional or original reinforcement fibers. The deformed fibers can exhibit various shapes, such as but not limited to, w-shaped, s-shaped, z-shaped and wedge-shaped. The shape can depend on the number of crimps formed. There may be a plurality of crimps formed or implemented along the length of the reinforcement fiber. In certain embodiments, there can be from one to six crimps per one inch of the length of the fiber.

The modified reinforcement fibers may be deformed or crimped individually. However, it may be more practical given known deformation or crimping methods and apparatus to deform or crimp a plurality of reinforcement fibers concurrently or simultaneously. Thus, in certain embodiments, a plurality of reinforcement fibers are deformed or crimped to form a deformed or crimped bundle or clip.

A plurality of the modified reinforcement fibers can be present in a composition or a bundle or a clip and used in various applications.

The crimping of a conventional or original non-crimped reinforcement fiber can be accomplished using conventional apparatus and methods known in the art. The crimping can be conducted prior to or following cutting of the fibers to a desired length.

The modified reinforcement fibers in accordance with the invention can be used in a variety of applications. In particular, the modified reinforcement fibers can be used in cementitious compositions to reduce or preclude the voids and/or cracks in cement. The modified reinforcement fibers can be used in drilling fluids to enhance the debris removal from a well bore and to provide lost circulation capability. Further, the modified reinforcement fibers can be used in cementitious compositions for drilling a well bore to provide crack control and lost circulation capability. The modified reinforcement fibers also can be dry blended or dispersed with dry constituents in a dry cement mix.

In certain embodiments, crimped fibers can be used alone or in combination with non-crimped fibers. A composition of reinforcement fibers can include only crimped fibers or a blend of crimped fibers and non-crimped fibers. For example, a plurality of crimped fibers may be added to a cementitious mixture or a plurality of crimped fibers and non-crimped fibers can be added to the cementitious mixture. In certain embodiments, the non-crimped fibers can include reinforcement fibers having a different modification, such as but not limited to, a coating or encapsulation material. It is typical for coating and encapsulation compositions to include polymer, non-polymer and mixtures thereof.

The amount or concentration of crimped and non-crimped fibers in the composition can vary. In certain embodiments, each of the crimped and non-crimped fibers are present in a concentration of about 50 weight percent based on total weight of the composition.

In general, reinforcement fibers can be selected from a wide variety of synthetic fibers and natural fibers known in the art, such as but not limited to, polymer fibers, aramid fibers and mixtures thereof. The polymer fibers can include polyolefin fibers, polyamide fibers, polyvinyl-chloride fibers, and mixtures thereof. The polyolefin fibers can be selected from the group of polypropylene fibers, polyethylene fibers, and mixtures thereof.

In certain embodiments, the plurality of reinforcement fibers includes hydrophobic and/or hydrophilic fibers selected from the group consisting of polyolefin, polyester, aramid, nylon, and mixtures thereof. In another embodiment, the reinforcement fibers include a mixture or blend of polyethylene, polypropylene and aramid fibers.

In general, reinforcement fibers known in the art can be hydrophobic or hydrophilic by nature. In certain embodiments, wherein the reinforcement fibers are not naturally hydrophilic, they can be rendered hydrophilic by applying a hydrophilic coating, such as a surfactant, to the surface of the fibers.

The plurality of reinforcement fibers, individually or together in combinations and blends, can include fibers in various forms, such as fibrillated, non-fibrillated, twisted, turned, and mixtures thereof. For example, the fibers suitable for use in the present invention can include fibers as disclosed in U.S. Pat. No. 6,753,081 B1 ("the '081 patent"). In the '081 patent, the fiber component includes a first fiber component formed of a homopolymer polypropylene fiber and a second fiber component being a copolymer formed of a polypropylene and a high density polyethylene. The first fiber component is fibrillated and the second fiber component is a twisted bundle including multiple strands of a non-fibrillating monofilament.

Further, the fibers suitable for use in the present invention can include fibers as disclosed in U.S. Pat. No. 7,168,232 ("the '232 patent"). In the '232 patent, the fiber includes a twisted bundle comprised of multiple strands of a non-fibrillating monofilament having a degree of twist greater than about 0.9 turns per inch. The '232 patent further discloses the twisted fiber component with another fiber component, discrete from the twisted fiber component, that is fibrillated.

Furthermore, the fibers suitable for use in the present invention can include fibers as disclosed in U.S. Pat. Nos. 6,016,872 and 6,164,380 ("the '872 patent" and "the '380 patent," respectfully). In these patents, the fibers include hydrophobic and/or hydrophilic fibers selected from the group consisting of polyolefins, polyester and nylon. The preferred fibers are the polyolefins, polypropylene and polyethylene, and the most preferred is polypropylene. Further, the fibers are most preferably comprised of a plurality of filaments processed in a tow form in bundles or in strips, from about one to two hundred, and preferably from two to six denier per filament, and most preferably from three to four denier. Alternatively, the fibers may be formed from fibrillated fibers, wherein the fibers are formed in interconnected networks. In another embodiment, the fibers may be a plurality of non-bundled monofilaments. The fiber strips are preferably cut in lengths. The '872 patent describes lengths of from about three or four millimeters to ten millimeters. Longer lengths may be used. Lengths of about ten millimeters or less are preferred, and lengths between about five and ten millimeters are most preferred. The '380 patent describes preferred lengths of from about three or four millimeters to 25 millimeters. Lengths between about 10 and 15 millimeters are more preferred and lengths of 12.5 millimeters are most preferred. The fibers may be naturally hydrophilic or may be coated with a hydrophilic coating, such as a surfactant. Examples of suitable fibers include polypropylene, polyethylene, nylon and polyester. The most preferred fiber is a polypropylene coated with a hydrophilic surfactant.

Moreover, the fibers suitable for use in the present invention can include fibers as disclosed in U.S. Pat. No. 5,399,195 ("the '195 patent"). In this patent, the fibers include polyolefin, polyolefin derivative, polyester, polyamide, or a mixture thereof. The fibers are in the form of a bundle and each bundle includes 50 to 5000 filaments. The aspect ratio, i.e., the ratio between length and diameter, of the individual filaments is typically about 200 to 800.

The disclosures of U.S. Pat. Nos. 7,168,232; 6,753,081; 6,164,380; 6,016,872; and 5,399,195 are incorporated herein by reference.

In certain embodiments, conventional or original reinforcement fibers are crimped by employing a crimper box, e.g., tow crimper, which is commercially available, for example, from DM&E Corporation. The conventional or original, e.g., un-crimped, reinforcement fibers are loaded into the crimper box which stuffs and bends the crimps into the fibers. The crimper box allows a plurality of fibers to be crimped at the same time. However, the crimper box has been found to be generally slow and require significant maintenance. Thus, alternatively, conventional or original, e.g., un-crimped, reinforcement fibers may be mechanically crimped by running the fibers through a gear or set of gears to provide the crimps. For either method of crimping, the fibers can be crimped while cold or hot. For example, the fibers can be crimped following the tow being pulled out of a box or the fibers can be crimped following extrusion.

The number of crimps formed in the length of the reinforcement fiber can vary. In general, the number of crimps should be sufficient to provide improved properties while maintaining the form of the fibers; e.g., in the form of a bundle, clip or multi-filament. Further, the number of crimps should be sufficient to preclude "fluffing" (e.g., cotton ball configuration) and to minimize clumping of the fibers. For example, more crimps may result in "fluffing" of particular fibers. In certain embodiments, the fibers can include six or less crimps per inch. In other embodiments, the fibers may include six or more crimps per inch.

Without intending to be bound by any particular theory, it is believed that the crimped reinforcement fibers can impart improved properties, such as, at least one of improved reinforcement properties, improved alignment properties and improved suspension properties. The improved alignment and suspension properties allow the modified reinforcement fibers to serve as carriers for other particles and fibers, and therefore the crimped reinforcement fibers can be especially effective as lost circulation material.

In the invention, the denier of the modified reinforcement fibers can vary. The denier of the fibers can depend on the material of the fiber, the configuration (e.g., monofilament, bundled, fibrillated, non-fibrillated, twisted, and turned), and their intended use (e.g., improved strength, debris removal, and lost circulation). In certain embodiments, the denier is about 4.0.

In the invention, the reinforcement fibers to be modified can be hydrophilic or hydrophobic.

The modified fibers of the invention can include known reinforcement fibers (e.g., non-crimped), including those above-described, which are crimped by being subjected to a deformation modification process, and then combined with known asphalt and portland cement concrete mixtures.

The crimped reinforcement fibers of the invention can be used in applications wherein non-crimped fibers are employed, such as liquids (e.g., drilling liquid) and liquid mixtures or slurries (e.g., wet concrete mixtures or slurries). For example, the crimped fiber-containing composition can be added to drilling liquids to enhance debris removal from a well bore and to improve lost circulation in a well bore. Further, the crimped fiber-containing composition can be added to wet concrete mixtures to improve strength. In drilling operations, the crimped fiber-containing composition can be added to cement which is pumped into a well bore to improve lost circulation in the well bore. In another embodiment, the crimped fiber-containing composition can be added to a concrete mixing machine or associated machinery, or in a hopper, or in a transportation vehicle, or after discharge from the mixing machine or associated machinery, or the hopper or the transportation vehicle. In certain embodiments, the crimped fiber-containing composition can be dispersed in the concrete material in the concrete mixing machine, or in associated machinery located either up-line or down-line from the mixing machine.

The amount of modified reinforcement fibers employed can depend on the type of mixture (e.g., wet mixture or dry mixture) and the intended function or use (e.g., improved strength, debris removal, and lost circulation).

The modified reinforcement fibers of the invention can be used to form a reinforcement fiber composition. The composition can include optional additives and fillers. Non-limiting examples include fly ash, silica compounds, wetting agent (e.g., surfactant), dispersant, accelerator, retarder, defoamer, and the like. For example, mineral fillers can include kaolin clay, calcium carbonate, barites, titanium dioxide, and mixtures thereof. Furthermore, vitrified shales are suitable for use, such as those including silicon, aluminum, calcium, and/or magnesium. In certain embodiments, when the modified fiber composition is used in drilling and/or cementing a well bore, it can optionally include mica or silica, such as for example, the product commercially available from Forta Corporation under the trade name PhenoSeal®. In other embodiments, the modified fiber composition can be employed in drilling operations as a hole cleaning and debris removing agent. Further, in this embodiment, the modified fiber composition can be combined with a product commercially available from Forta Corporation under the trade name Super Sweep®.

The crimped reinforcement fibers of the invention can be used in a wide variety of cementious materials. Suitable examples include hydraulic cements that include calcium, aluminum, silicon, oxygen and/or sulfur, which set and harden by reaction with water. Such hydraulic cements include, but are not limited to, Portland cements, pozzolana cements, gypsum cements, high-alumina-content cements, slag cements, silica cements and combinations thereof. In certain embodiments, the hydraulic cement may include a portland cement.

In one embodiment, the crimped reinforcement fibers of the invention are used in a cement composition which includes cement and water. The water may be freshwater, saltwater, brines, (e.g., water containing one or more salts dissolved therein), seawater or combinations thereof. In general, the water may be present in an amount sufficient to form a pumpable slurry. In particular embodiments, the water may be present in the cement compositions in an amount of from about 33% to about 200% by weight of the cement on a dry basis. As previously described, optional additives and fillers may also be included in the cement composition.

The crimped or deformed reinforcement fibers of the invention can be used in a wide variety of applications. For example, the crimped reinforcement fibers can be used as a reinforcement component to building and construction materials, such as concrete, including asphalt cement concrete and Portland cement concrete and the like, in, for example, structural pavements, airport runways and tarmacs, bridge deck overlays, floors, and pre-cast concrete products. The crimped reinforcement fibers of the invention may also be used for repair, rehabilitation, retrofit, and renovation of existing products or structures, such as, for example, in overlays, and repairs of airport pavements, bridge decks, parking areas, roadways, and the like, including patching and filling potholes.

EXAMPLES

Figure 2:
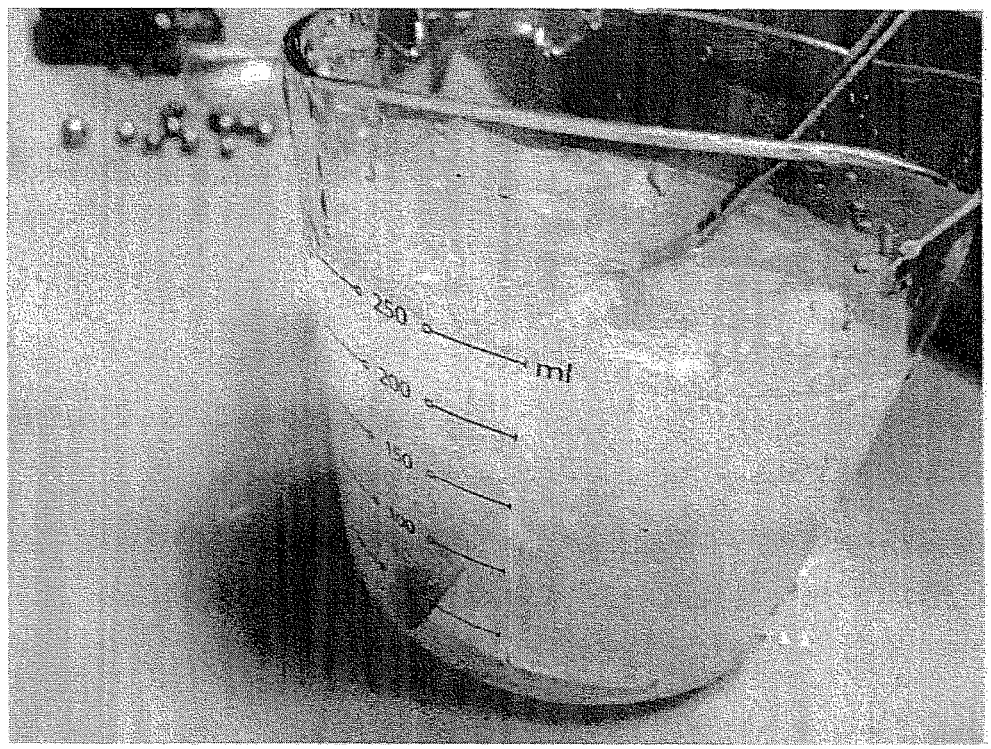

Example 1—Comparison of Crimped Reinforcement Fibers with Non-Crimped Reinforcement Fibers About 2.5 grams of non-crimped fibers were obtained. The non-crimped fibers were composed of polypropylene fibers treated with a hydrophilic surfactant. All fibers were 0.5 inch, 4.0 denier. The non-crimped fibers were added to one cup of water in a transparent container and mixed thoroughly. On the surface of the fiber and water mixture was placed a plurality of 1.5 gram weights. FIG. 1 shows that the non-crimped fibers were incapable of suspending any of these weights. Each of the weights fell to the bottom of the container. Further, on the surface of the fiber and water mixture was placed a conventional spoon. FIG. 2 shows that the non-crimped fibers were incapable of suspending the spoon. The spoon fell to the bottom or the container. There were heavier weights available for testing, however, since the non-crimped fiber was incapable of suspending these lowest weights, none of the heavier weights were tested.

About 2.5 grams of crimped fibers were obtained. The crimped fibers were composed of polypropylene fibers treated with a hydrophilic surfactant. All fibers were 0.5 inch, 4.0 denier, having 6.0 crimps per inch. The crimps in the fibers were mechanically produced in a crimper box manufactured by DM&E Corporation. The crimped fibers were added to one cup of water in a transparent container and mixed thoroughly. On the surface of the fiber and water mixture was placed each of the following weight samples.

Ten—3.6 gram weights;
Seven—7.2 gram weights; and
A conventional spoon.

Figure 3A:
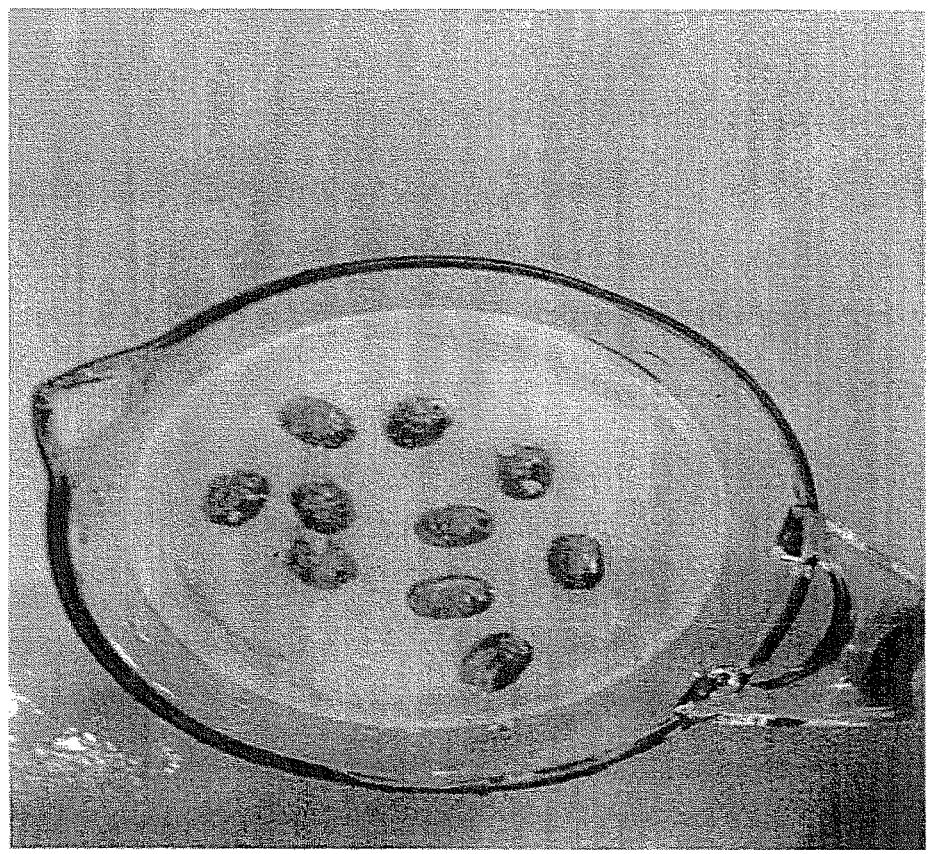
FIGS. 3A, 3B, 4A, 4B and 5 are photographs which illustrate the suspension capability of crimped fibers, in accordance with certain embodiments of the invention.
Figure 3B:
Figure 4A:
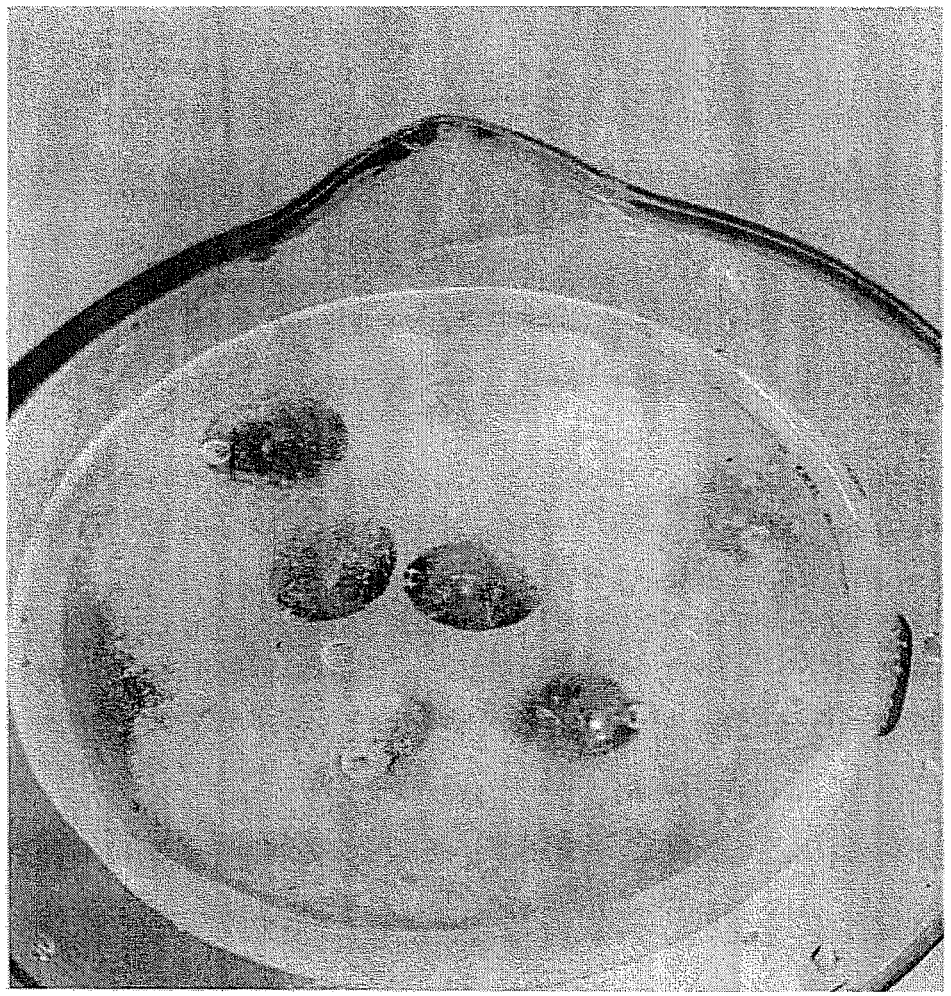
Figure 4B:
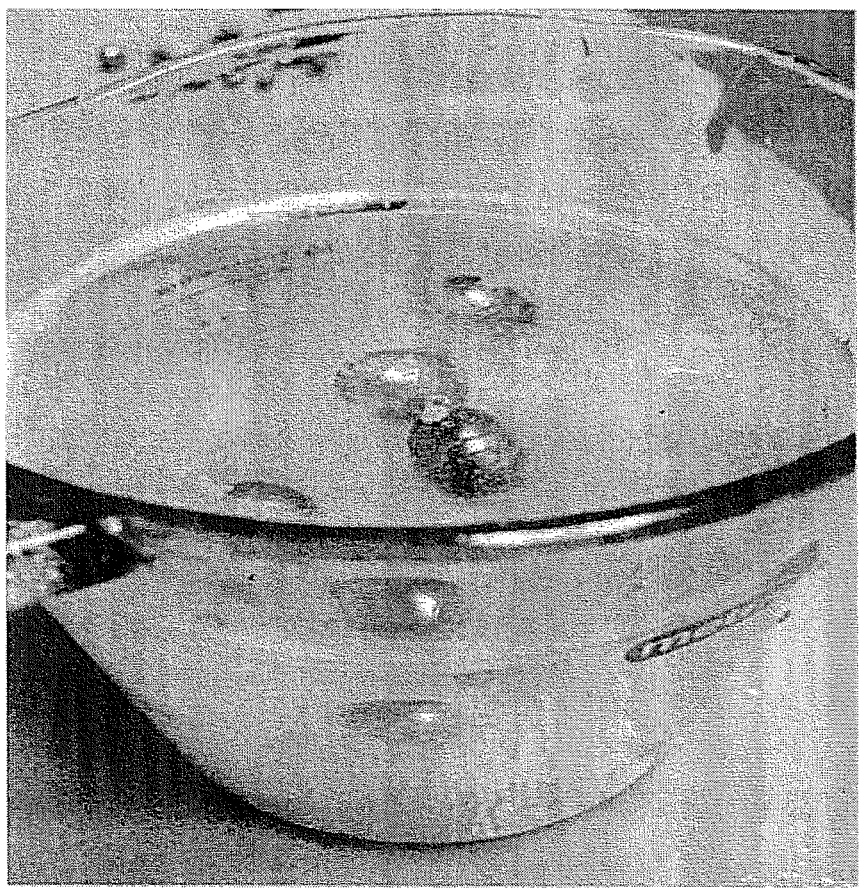
Figure 5:
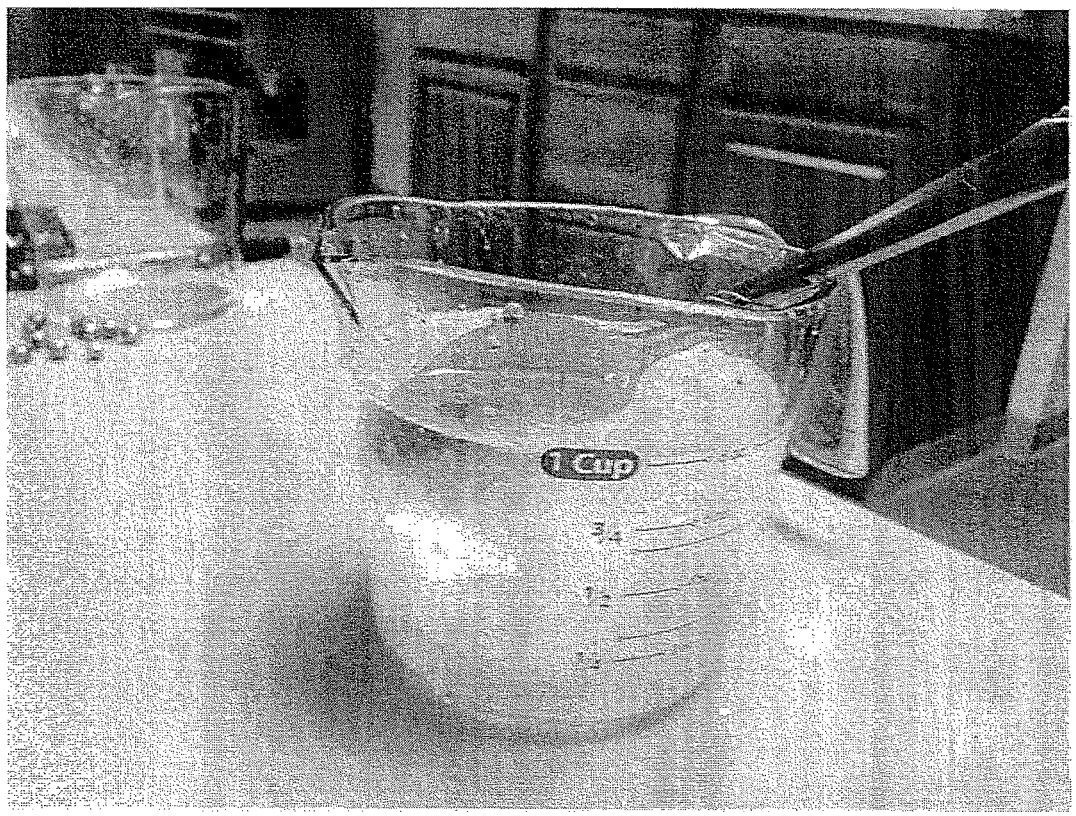

FIGS. 3, 4 and 5, respectively, show that the crimped fibers were capable of suspending all of these weight samples in the crimped fibers/water mixture.

Figure 6:
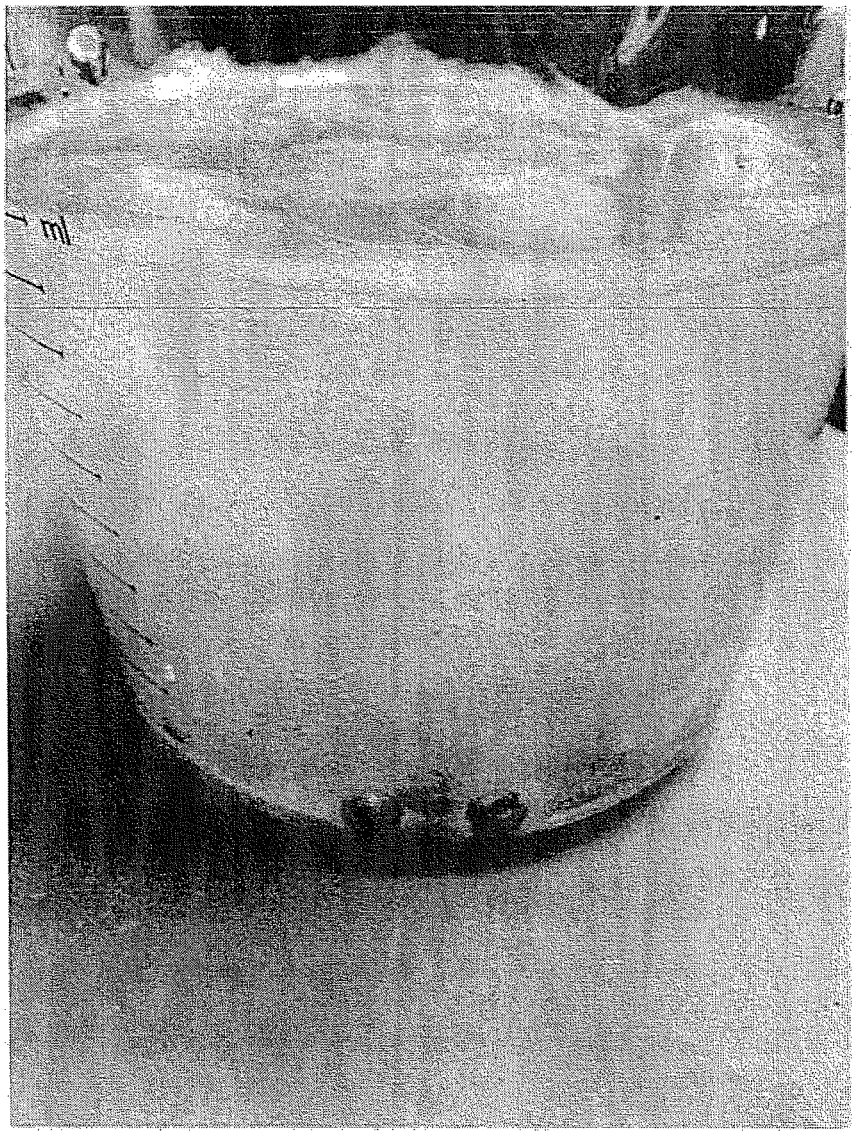
FIGS. 6 and 7 are photographs which illustrate the suspension capability of non-crimped fibers.
Figure 7:
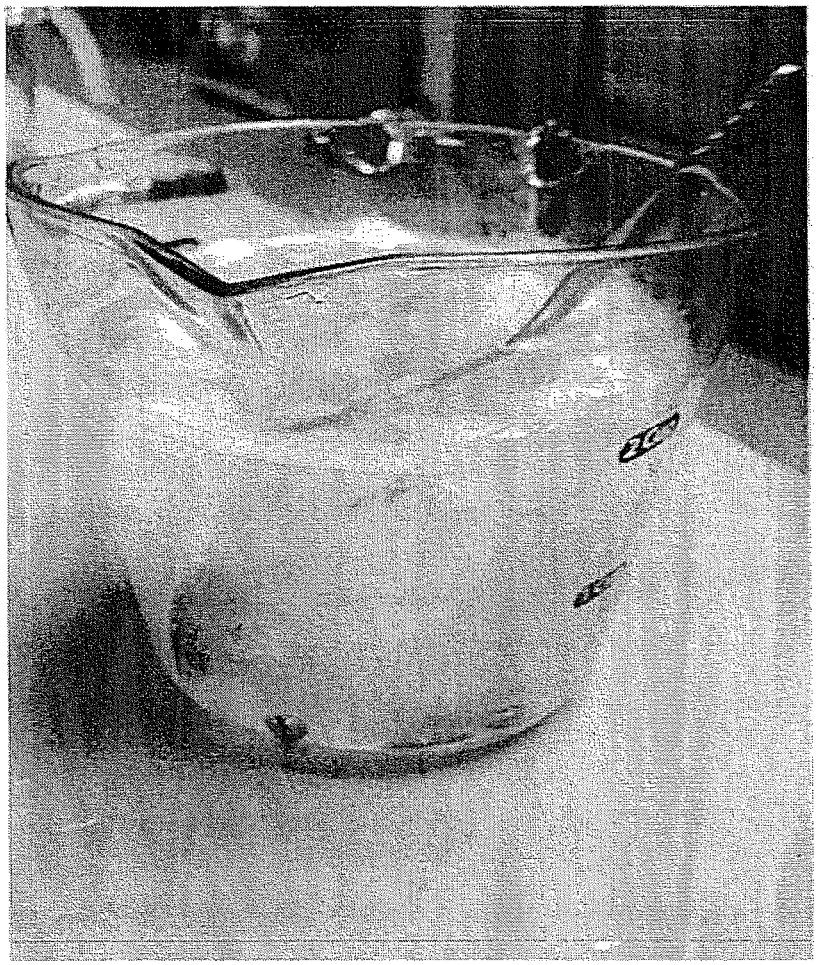

Example 2—Comparison of Crimped Reinforcement Fibers with Non-Crimped Reinforcement Fibers About 5.0 grams of non-crimped fibers were added to two cups of water in a transparent container and mixed thoroughly. The non-crimped fibers were composed of polypropylene fibers treated with a hydrophilic surfactant. All fibers were 0.5 inch, 4.0 denier. On the surface of the fiber and water mixture was placed a plurality of 1.5 gram weights. FIG. 6 shows that the non-crimped fibers were incapable of suspending any of these weights. Each of the weights fell to the bottom of the container. Further, on the surface of the fiber and water mixture was placed a conventional spoon. FIG. 7 shows that the non-crimped fibers were incapable of suspending the spoon. The spoon fell to the bottom of the container. There were heavier weights available for testing, however, since the non-crimped fiber was incapable of suspending these lowest weights, none of the heavier weights were tested.

About 5.0 grams of crimped fibers were added to two cups of water in a transparent container and mixed thoroughly. The crimped fibers were composed of polypropylene fibers treated with a hydrophilic surfactant. All fibers were 0.5 inch, 4.0 denier, having 6.0 crimps per inch. On the surface of the fiber and water mixture was placed each of the following weights.

Seven—7.2 gram weights;
A conventional spoon;
Ten—3.6 gram weights and seven—7.2 gram weights.

Figure 8A:
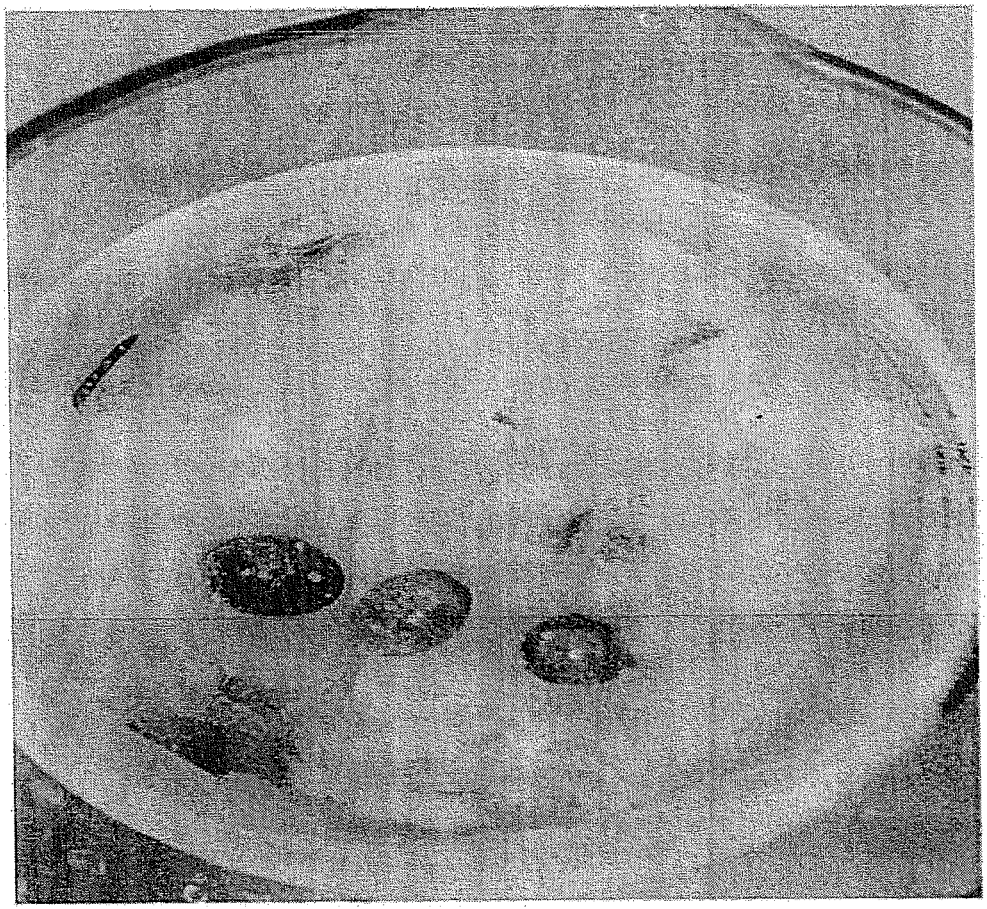
FIGS. 8A, 8B, 9 and 10 are photographs which illustrate the suspension capability of crimped fibers, in accordance with certain embodiments of the invention.
Figure 8B:
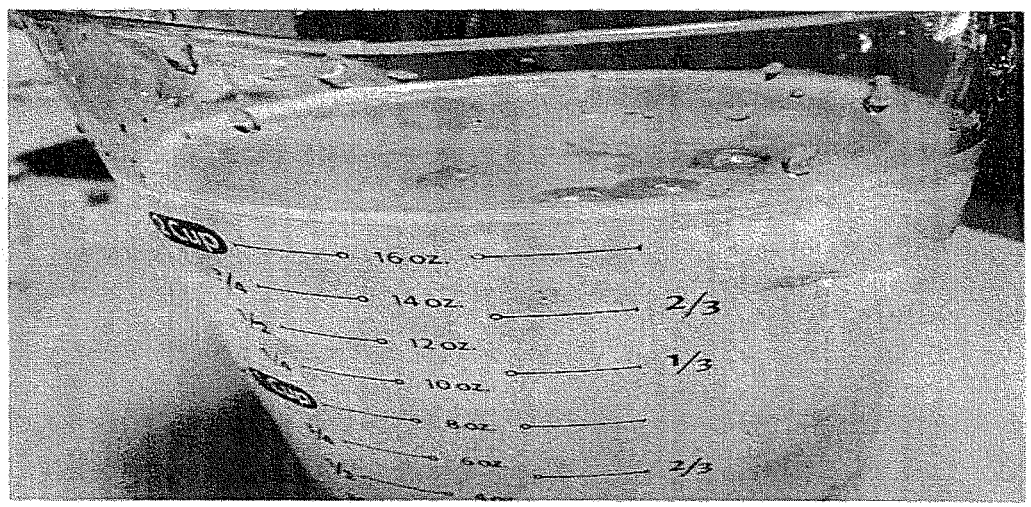
Figure 9:
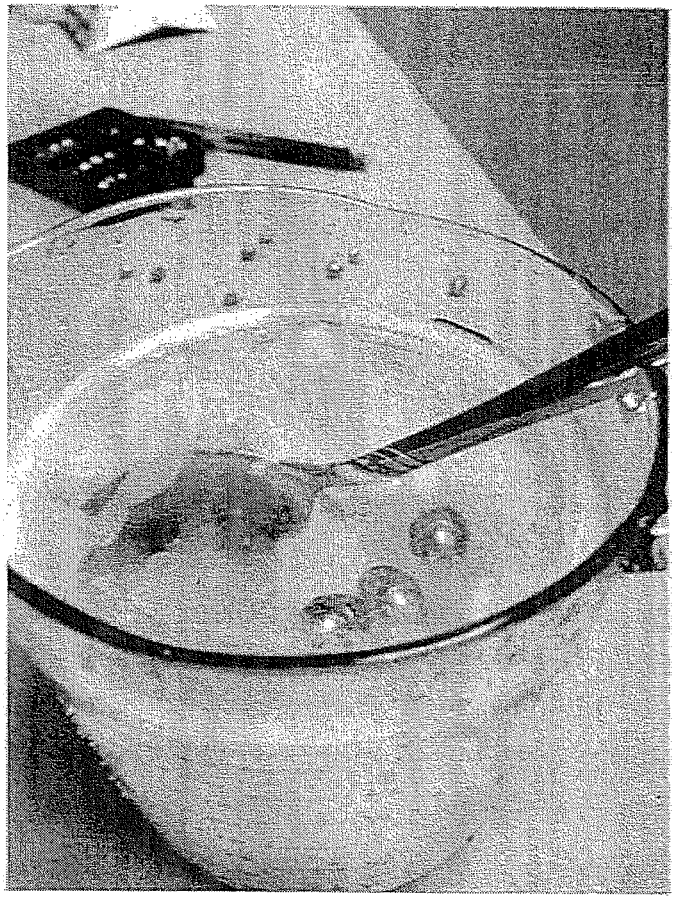
Figure 10:
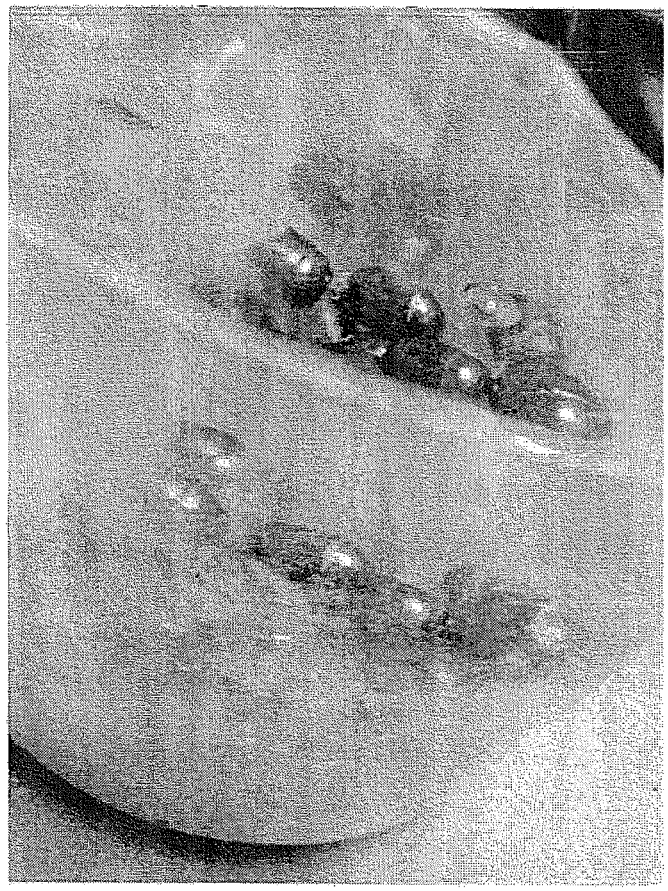

FIGS. 8, 9 and 10, respectively, show that the crimped fibers were capable of suspending all of these weight samples in the crimped fibers/water mixture.

Example 3—Nozzle Alignment of Fibers

Figure 11:
FIG. 11 is a photograph which illustrates the nozzle alignment capability of crimped fibers, in accordance with certain embodiments of the invention.
Figure 12:
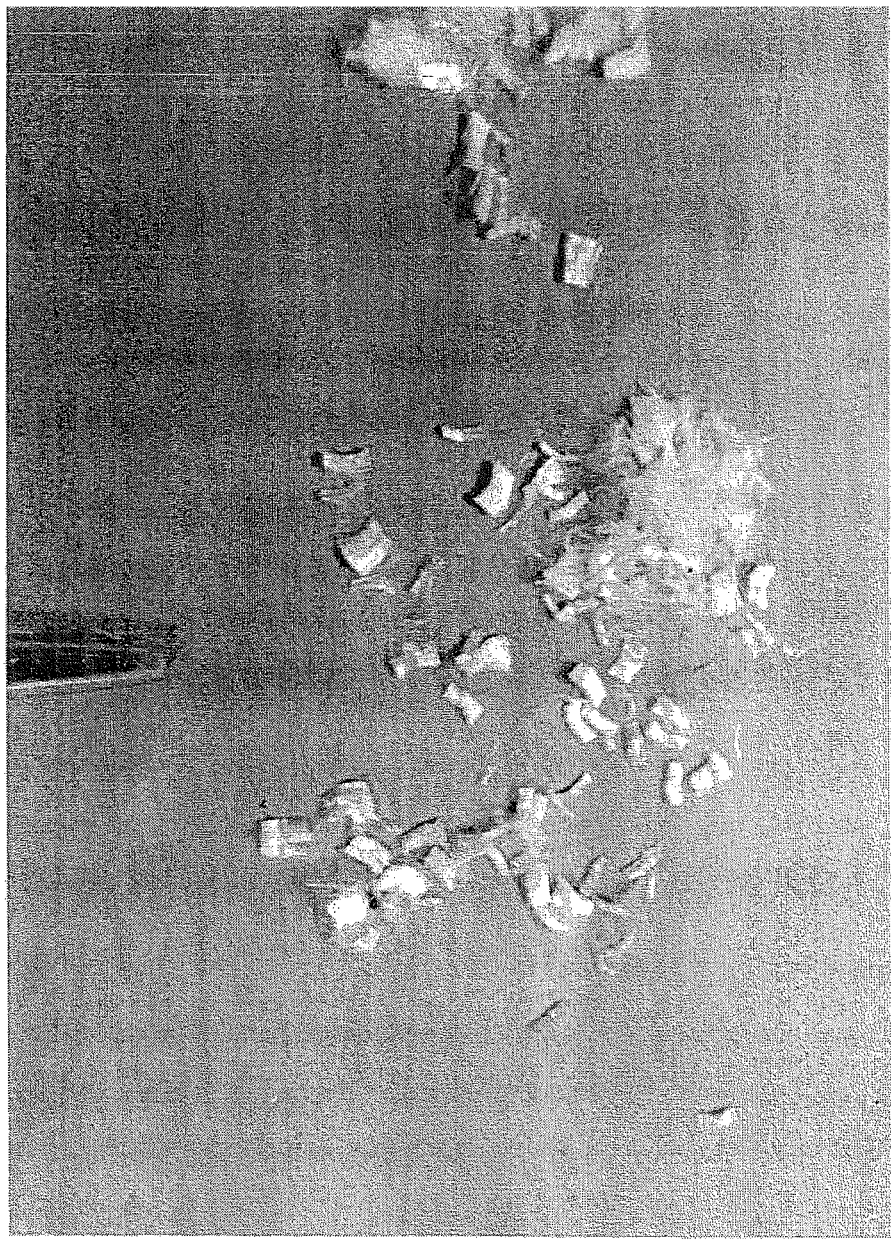
FIG. 12 is a photograph which illustrates the nozzle alignment capability of non-crimped fibers.

A plurality of non-crimped fibers and a separate plurality of crimped fibers were placed on a flat surface. The non-crimped and crimped fibers were composed of polypropylene fibers treated with a hydrophilic surfactant. All fibers were 0.5 inch, 4.0 denier. The crimped fibers had 6.0 crimps per inch. Each of the fiber samples was subjected to light pressure. Air was discharged from an air cleaning nozzle at light pressure (10 psi) pressure directed to the fibers. It was demonstrated that the crimped fibers aligned horizontally in a shorter period of time as compared with the alignment of the non-crimped fibers. FIG. 11 shows the alignment of the crimped fibers following about 2 seconds of exposure to the light pressure and FIG. 12 shows the alignment of the non-crimped fibers following about 2 seconds of exposure to the light pressure. As shown in FIGS. 11 and 12, respectively, the crimped fibers are substantially aligned and the non-crimped fibers remain substantially unaligned.

Results

The crimped (e.g., w-shaped, s-shaped, and wedge-shaped) fibers clearly exhibited an improved ability to suspend weighted objects as compared to the non-crimped, i.e., straight, fibers. Thus, without being bound by any particular theory, it is believed that the crimped fibers can be effective as a moving filter or particle carrier.

Further, in the Examples, unopened fiber bundles were used to demonstrate the nozzle effect on fibers because individual fibers may not have been as easily photographed.

However, when individual fibers were used, they were found to align at least as well and even better than the fiber bundles shown in FIG. 8. The ability of the crimped fibers to align in a horizontal direction to the nozzle can also be indicative of these fibers being effective as carriers under pressure. Without intending to be bound by any theory, it is believed that the shape is able to create an improved surface area to hold and control the load as compared to those fibers without crimps. It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A modified reinforcement fiber-containing drilling liquid, comprising:
    a drilling liquid; and
    a reinforcement fiber component in a form selected from individual fibers, a clip of fibers and a bundle of fibers, at least a portion of the reinforcement fiber component comprises a plurality of modified reinforcement fibers each having a length from about 3 to 25 millimeters and a deformation formed in the length, wherein the deformation includes at least one crimp,
    wherein, the reinforcement fiber component and the drilling liquid form a blend or mixture, and
    wherein, the modified reinforcement fiber-containing drilling liquid is effective to increase suspension and debris removal from a wellbore as compared to a drilling liquid absent of the plurality of modified reinforcement fibers.

2. The drilling liquid of claim 1, wherein the reinforcement fiber component is selected from the group consisting of polyolefin reinforcement fibers, aramid reinforcement fibers, nylon reinforcement fibers and blends thereof.

3. The drilling liquid of claim 2, wherein the reinforcement fiber component is selected from the group consisting of polyethylene reinforcement fibers, polypropylene reinforcement fibers, aramid reinforcement fibers and blends thereof.

4. The drilling liquid of claim 1, wherein the reinforcement fiber component comprises a blend of modified reinforcement fibers and non-modified reinforcement fibers.

5. The drilling liquid of claim 1, wherein the plurality of modified reinforcement fibers has a denier of about 4.0.

6. The drilling liquid of claim 1, wherein the plurality of modified reinforcement fibers each has a length between about 10 and 15 millimeters.

* * * * *